(12) United States Patent
Lambright

(10) Patent No.: US 6,443,516 B2
(45) Date of Patent: Sep. 3, 2002

(54) EXTENDABLE AND RETRACTABLE SUPPORT SYSTEMS

(76) Inventor: Michael Lambright, 14867 County Rd. 20, Middlebury, IN (US) 46540

(*) Notice: Subject to any disclaimer, the term of this patent is extended or adjusted under 35 U.S.C. 154(b) by 0 days.

(21) Appl. No.: 09/733,470

(22) Filed: Dec. 8, 2000

Related U.S. Application Data
(60) Provisional application No. 60/169,795, filed on Dec. 9, 1999.

(51) Int. Cl.[7] ............................................... B60P 3/355
(52) U.S. Cl. .................... 296/26.05; 296/173; 52/66
(58) Field of Search ....................... 296/26.05, 171, 296/176, 173, 175, 165; 52/66

(56) References Cited

U.S. PATENT DOCUMENTS

| | | | |
|---|---|---|---|
| 3,514,150 A | * | 5/1970 | Wallace ..................... 296/173 |
| 3,519,306 A | | 7/1970 | Young |
| 3,528,698 A | * | 9/1970 | Miller ............................ 52/66 |
| 3,924,889 A | | 12/1975 | Gogush |
| 3,981,529 A | | 9/1976 | Bontrager |
| 4,171,843 A | | 10/1979 | Steury |
| 4,201,413 A | | 5/1980 | Rowe |
| 4,317,590 A | | 3/1982 | Young |
| 4,362,258 A | | 12/1982 | French |
| 4,981,319 A | | 1/1991 | Gerzeny et al. |
| 5,704,677 A | | 1/1998 | Steury et al. |
| 5,769,485 A | | 6/1998 | Bontrager et al. |
| 5,865,499 A | | 2/1999 | Keyser |

FOREIGN PATENT DOCUMENTS

GB 978058 * 12/1964

* cited by examiner

Primary Examiner—Dennis H. Pedder
(74) Attorney, Agent, or Firm—Baker & Daniels

(57) ABSTRACT

A cableless extendable and retractable support system for raising and lower a structure that includes a base, a structure to be raised and lowered relative to the base, a plurality of telescopic assemblies coupled between the base and structure to be raised and lowered, a plurality of spring elements having ends that are coupled between the plurality of telescopic assemblies and a lift tube assembly, the lift tube assembly including a mechanism which, when activated, selectively extends or retracts each of the plurality of spring elements therefrom and a housing which encloses the entire mechanism that extends and retracts the plurality of spring elements. According to one embodiment, the mechanism that extends and retracts the plurality of spring elements includes a drive screw and a driven screw and a pair of opposed push blocks which are mounded on the drive and driven screws, the first ends of each of the plurality of spring elements being coupled to the pair of push blocks. According to another embodiment of the invention, the mechanism that extends and retracts the plurality of spring elements includes a drum assembly upon which pairs of the spring elements are wound in opposite direction and a drive assembly to rotate the drum assembly.

14 Claims, 12 Drawing Sheets

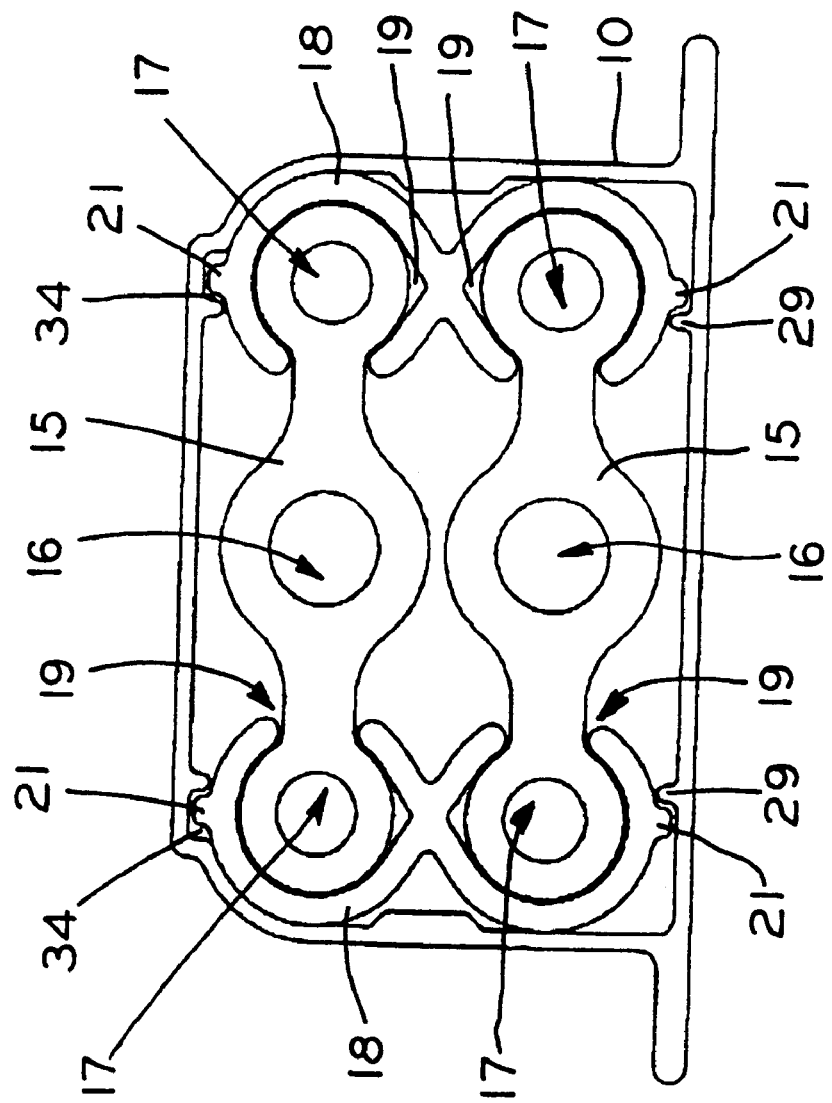

EXTENDABLE AND RETRACTABLE SUPPORT SYSTEMS

RELATED APPLICATIONS

The application is based upon U.S. Provisional Patent Application Serial No. 60/169,795, filed Dec. 9, 1999, the complete disclosure of which is hereby expressly incorporated by reference.

TECHNICAL FIELD

The present invention relates to mechanisms which are used to raise and lower structures, including covers or tops of mobile and immobile dwellings. More particularly, the present invention is directed to cableless extendable and retractable support systems which are used to raise and lower various structures, including covers or tops of mobile and immobile dwellings.

BACKGROUND ART

Towable tent campers and pop-up trailers having collapsible roofs are generally known in the art. Prior art mechanisms used for raising and lowering collapsible tops on such structures are generally balky, hard to operate and maintain, and prone to failure. For example, many lifting mechanisms rely on cranks and cables that are exposed to the elements, can accumulate dirt and debris, and can bind, slip and stretch. Mechanisms which are based upon gear driven assemblies are significantly heavier and more expensive to produce.

The following U.S. Patents exemplify known lifting mechanisms: U.S. Pat. No. 5,865,499 to Keyser, U.S. Pat. No. 5,769,485 to Bontrager et al., U.S. Pat. No. 5,704,677 to Steury et al., U.S. Pat. No. 4,981,319 to Gerzeny et al., U.S. Pat. No. 4,362,258 to French, U.S. Pat. No. 4,317,590 to Young, U.S. Pat. No. 4,201,413 to Rowe, U.S. Pat. No. 4,171,843 to Steury, U.S. Pat. No. 3,981,529 to Bontrager, U.S. Pat. No. 3,924,889 to Gogush, and U.S. Pat. No. 3,519,306 to Young.

The present invention provides cable-less extendable and retractable support systems which can be used to raise and lower various structures, including covers or tops of mobile and immobile dwellings.

DISCLOSURE OF THE INVENTION

According to other features, characteristics, embodiments and alternatives of the present invention which will become apparent to those skilled in the art as the description thereof proceeds, the present invention provides a cableless extendable and retractable support system for raising and lower a structure which includes:

- a base;
- a structure to be raised and lowered relative to the base;
- a plurality of telescopic assemblies coupled between the base and structure to be raised and lowered;
- a plurality of spring elements having first and second ends with second ends thereof coupled to the plurality of telescopic assemblies; and
- a lift tube assembly coupled to first ends of each of the plurality of spring elements, the lift tube assembly including a mechanism which, when activated, selectively extends or retracts each of the plurality of spring elements therefrom and a housing which encloses the entire mechanism that extends and retracts the plurality of spring elements.

According to one embodiment of the invention, the mechanism that extends and retracts the plurality of spring elements includes a drive screw and a driven screw and a pair of opposed push blocks which are mounded on the drive and driven screws, the first ends of each of the plurality of spring elements being coupled to the pair of push blocks.

According to another embodiment of the invention, the mechanism that extends and retracts the plurality of spring elements includes a drum assembly upon which pairs of the spring elements are wound in opposite direction and a drive assembly to rotate the drum assembly.

BRIEF DESCRIPTION OF DRAWINGS

The present invention will be described hereafter with reference to the attached drawings which are given as non-limiting examples only, in which:

FIG. 14 is a cross sectional view of a guide assembly for the push blocks according to one embodiment of the present invention.

DESCRIPTION OF BEST MODE FOR CARRYING OUT THE INVENTION

The present invention is directed to mechanisms which are used to raise and lower structures, including covers or tops of mobile or immobile dwellings. More particularly, the present invention is directed to cableless extendable and retractable support systems which are used to raise and lower various structures, including covers or tops of mobile and immobile dwellings.

The extendable and retractable support systems of the present invention utilize mechanisms which push flexible rods such as extension springs through tubular guides. The distal ends of the flexible rods are coupled to or otherwise engage end portions of telescopic assemblies which are configured to support the tops, covers, caps, roofs, etc. of various structures including stationary and mobile structures such as campers, mobile homes, trailers, etc. as well as permanent and temporarily facilities, huts, dwellings, shelters, etc.

According to one embodiment, the flexible rods are coupled to push blocks which are driven by threaded screws of a main lift tube assembly.

According to another embodiment, the flexible rods are coupled to arms located on rotatable drums. Rotating the drums in one direction causes the flexible rods to be pushed outward in tangentially coupled tubular guides. Rotating the drums in an opposite direction causes the flexible rods to be wound within the drums and pulled inward from the tubular guides.

It is noted that although the extendable and retractable support systems of the present invention are described herein with reference to a pop-up camper, the extendable and retractable support systems are not to be construed as being limited for use with pop-up campers. In this regard, the extendable and retractable support systems of the present invention can be used in conjunction with any type of structure including stationary and mobile structures such as campers, mobile homes, trailers, etc. as well as permanent and temporarily facilities, huts, dwellings, shelters, etc.

Figure 1:
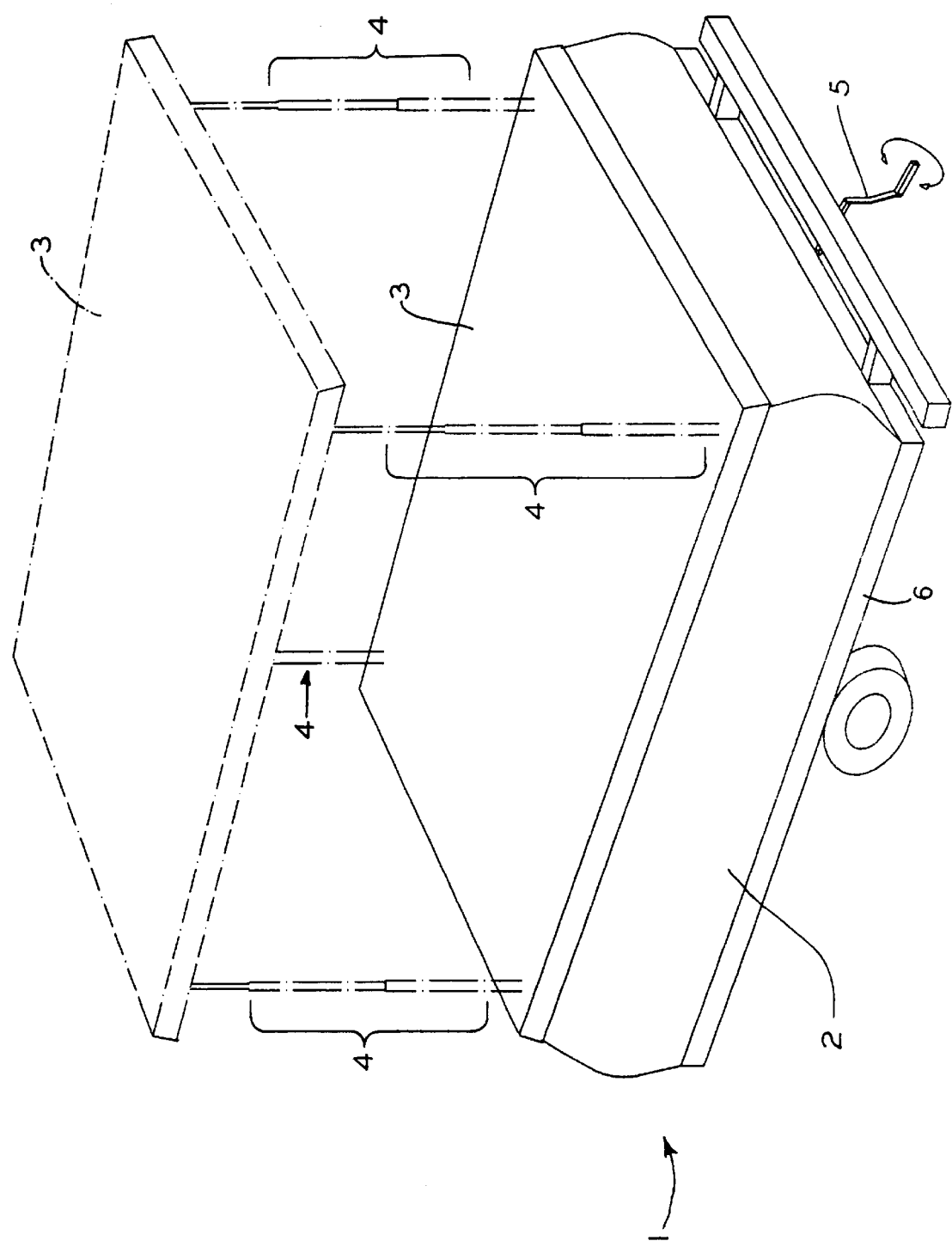
FIG. 1 is a perspective view of a camper which has a top that is movable between raised and lowered positions.

FIG. 1 is a perspective view of a camper which has a top that is movable between raised and lowered positions. The camper 1 includes a frame 6, a base 2 which underlies a top 3 that can be raised or lowered by telescopic tube assemblies 4 located adjacent outer corners of the top 3. The lowered position of top 3 is depicted in solid lines and the raised position is depicted in phantom. The telescopic tube assemblies 4 are depicted in phantom in their raised positions. FIG. 1 also depicts a manual crank handle 5 which can be used to activate the mechanism that raises and lowers the top 3. It is to be understood that, although camper 1 is used in FIG. 1 for illustrative purposes, the extendable and retractable support system of the present invention can be used in conjunction with various structures including stationary and mobile structures such as campers, mobile homes, trailers, etc. as well as permanent and temporarily facilities, huts, dwellings, shelters, etc, The extendable and retractable support systems of the present invention can be used to raise and lower, tops, covers, caps, roofs and similar structures.

In FIG. 1, the top 3 is depicted as being substantially coextensive with base 2. In other embodiments, the extendable and retractable support systems of the present invention can be used in conjunction with covers or tops that are not coextensive with their respective bases. Also, the extendable and retractable support systems of the present invention can use telescopic tube assemblies which are positioned in any suitable location to support the weight of a cover, top, canopy, etc.

Although a manual crank handle 5 is depicted in FIG. 1, it is to be understood that the extendable and retractable support systems of the present invention can be used in conjunction with an electrically driven mechanism.

Figure 2:
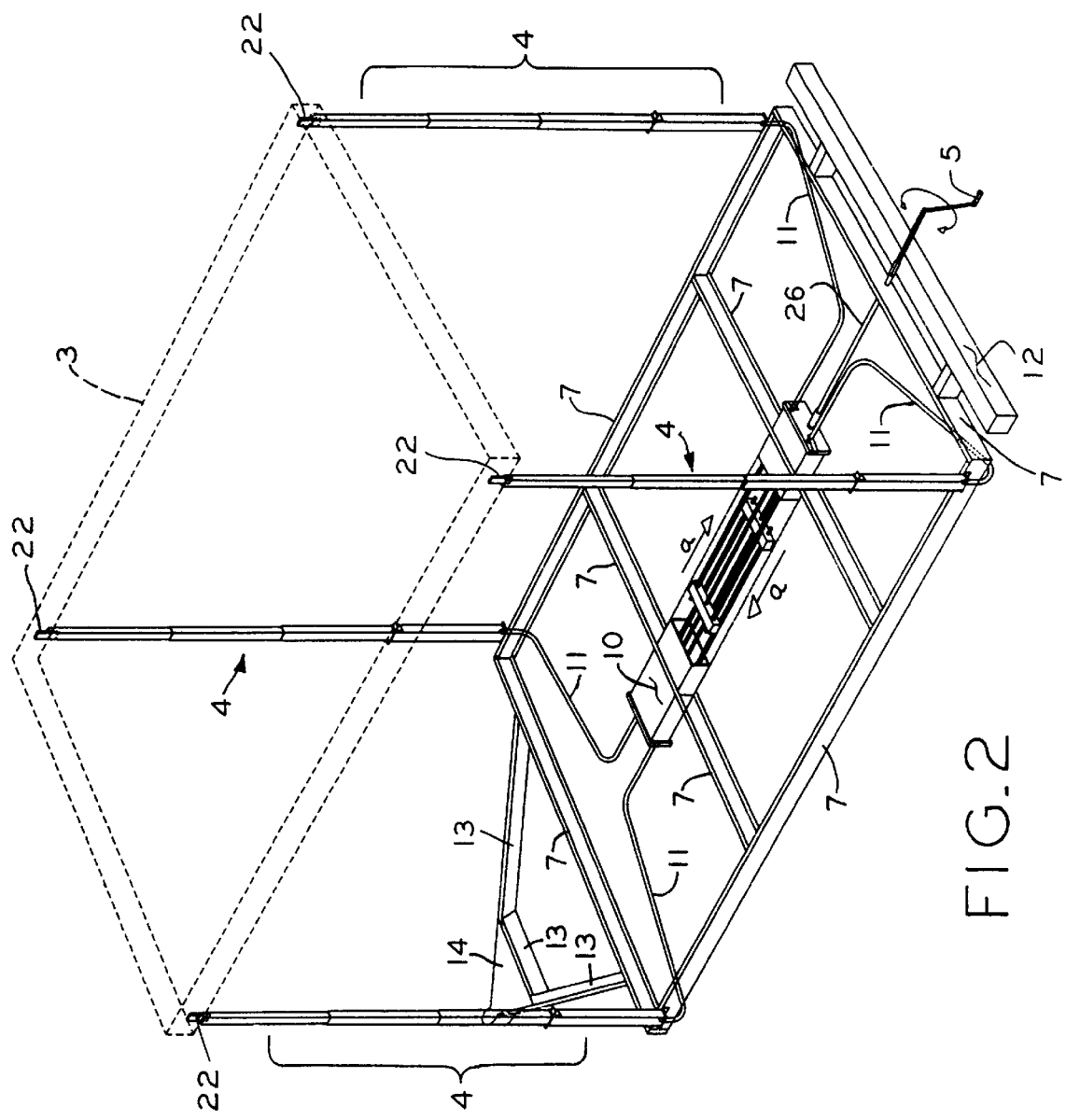
FIG. 2 is a perspective view of a camper frame which includes an extendable and retractable support system according to one embodiment of the present invention.

FIG. 2 is a perspective view of a camper frame which includes an extendable and retractable support system according to the present invention. FIG. 2 depicts how the extendable and retractable support mechanism of the present invention can be coupled to frame elements 7 of camper 1. That is, the main lift tube assembly 10 is depicted as being centrally located in the base 6 of the camper between frame elements 7. The telescopic tube assemblies 4 are coupled to the main lift tube assembly 10 by spring tubes 11. Spring tubes 11 are conduit structures in which spring elements 20, e.g. extension springs (FIG. 4) extend between main lift tube assembly 10 and the upper sections of the telescopic tube assemblies 4. As the main lift tube assembly 10 extends and retracts spring elements 20 therefrom, the spring elements 20 moved through spring tubes 11. Spring tubes 11 contain or guide the movement of spring elements 20 so that spring elements 20 raise and lower telescopic tube assemblies 4. Arrows "a" in FIG. 2 depict how push blocks 30, 31 (FIG. 4) of the main lift tube assembly 10 move when the spring elements 20 are pushed through spring tubes 11.

FIG. 2 depicts how the manual crank handle 5 can be positioned to extend beyond the bumper 12 of camper 1. Although FIG. 2 depicts the main lift tube assembly 10 as being orientated so that the manual crank handle 5 extends from the rear of the camper 1, it is possible to orient the main lift tube assembly 10 so that the manual crank handle 5 extends from one of the sides or the front of camper 1. The frame 13 of the tongue 14 of the camper 1 is depicted in FIG. 2.

Figure 3:
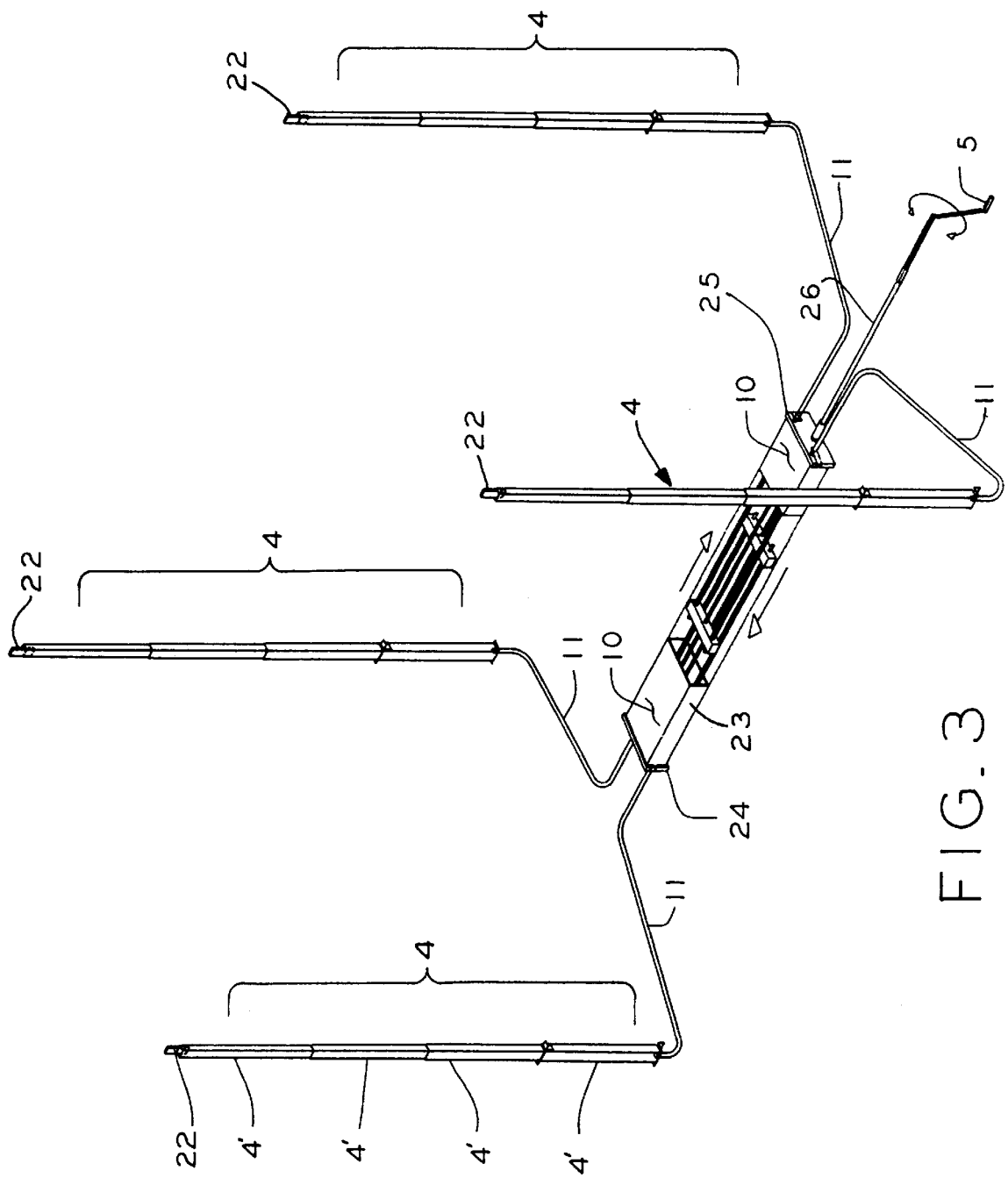
FIG. 3 is a perspective view of the extendable and retractable support system of FIG. 2.

FIG. 3 is a perspective view of the extendable and retractable support system of FIG. 2.

FIG. 3 depicts the telescopic tube assemblies 4 as having a plurality of elements 4' which can expand in a telescopic manner. The upper or distant most or end element of the telescopic tube assemblies 4 includes a bracket 22 by which the telescopic tube assemblies 4 can be coupled to a top, cover, etc.

The main lift tube assembly in FIG. 3 includes a housing 23 which is depicted with the center removed to show the internal elements thereof. The housing 23 includes a front end cap 24 and a rear end cap 25. A crank tube 26 extends between the main lift tube assembly 10 and the manual crank handle 5. In embodiments that include an electrically actuated crank mechanism, crank tube 26 and manual crank handle 5 can be eliminated or included as a manual back-up mechanism.

Figure 4:
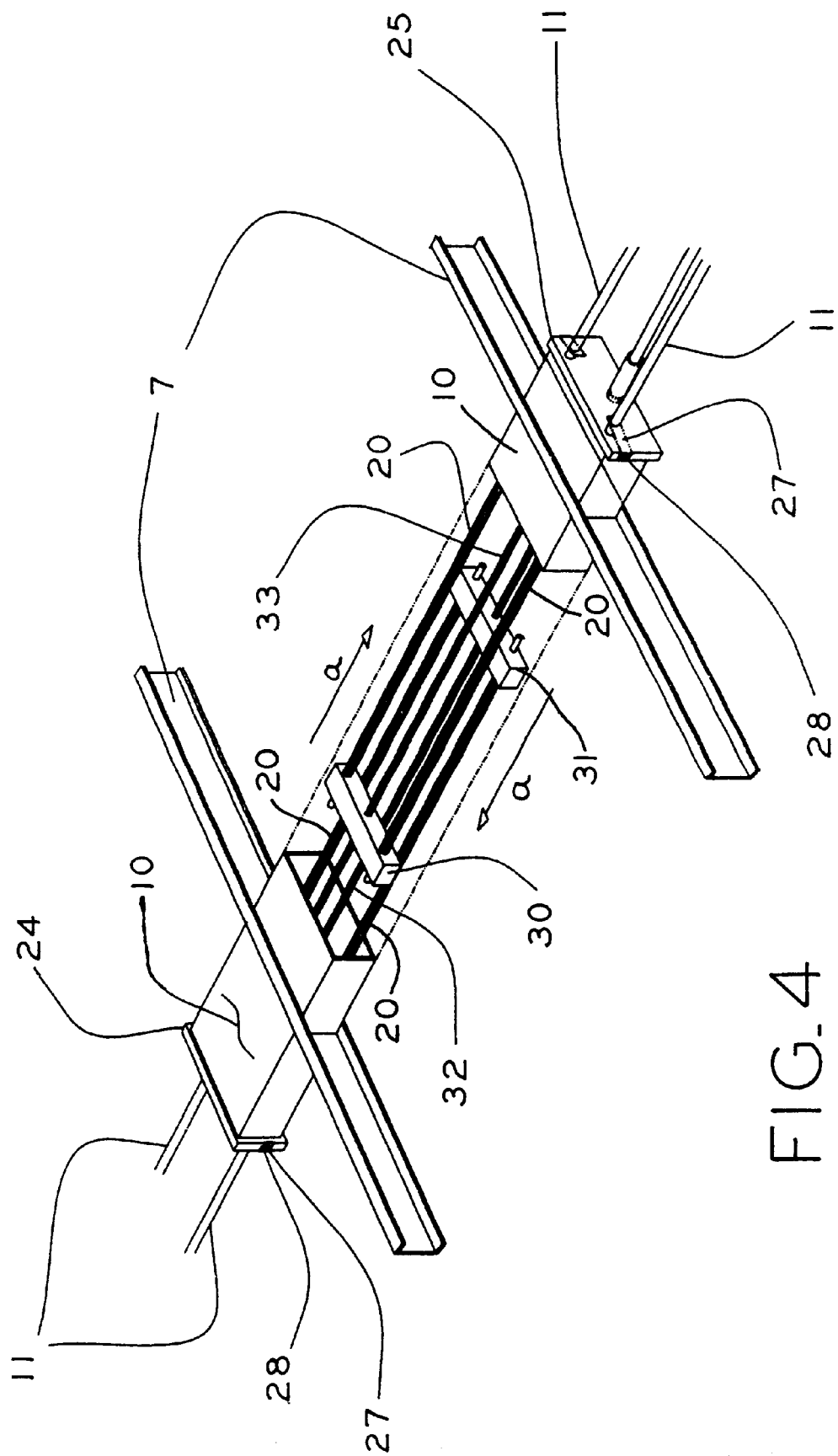
FIG. 4 is a perspective detailed view of the extendable and retractable support system of FIG. 3.

FIG. 4 is a perspective detailed view of the extendable and retractable support systems of FIG. 3. FIG. 4 depicts the spring tubes 11 as being coupled to the front and rear end caps 24, 25. The spring tubes 11 are coupled to the front and rear caps 24, 25 in a manner that allows the spring elements 20 to be pushed into and pulled from the spring tubes 11. Although any convenient manner of coupling the spring tubes 11 to the front and rear end caps 24, 25 can be utilized, FIG. 4 illustratively depicts spring tube end cap brackets 27 that can be secured to front and rear caps 24, 25 by mechanical fasteners 28 such as screws. Spring tube end cap brackets 27 are coupled to spring tubes 11 and include openings which are aligned with the central bores of the spring tubes 11.

Ends of spring elements 20 are coupled to opposed push blocks 30, 31 which are contained in housing 23 of main lift tube assembly 10. Push blocks 30, 31 are moved longitudinally within housing 23 by a drive screw 32 and a driven screw 33 as discussed below. As push blocks 30, 31 are moved in the direction of arrows "a" in FIG. 4, spring elements 20 are pushed outward from the main lift tube assembly 10 into spring tubes 11. As spring elements 20 are pushed into spring tubes 11 they push the telescopic tube assemblies 4 upward. When the push blocks 30, 31 pulled inward in a direction opposite to arrows "a" the spring elements 20 are retracted in spring tubes 11 so that the telescopic tube assemblies 4 collapse.

Figure 5:
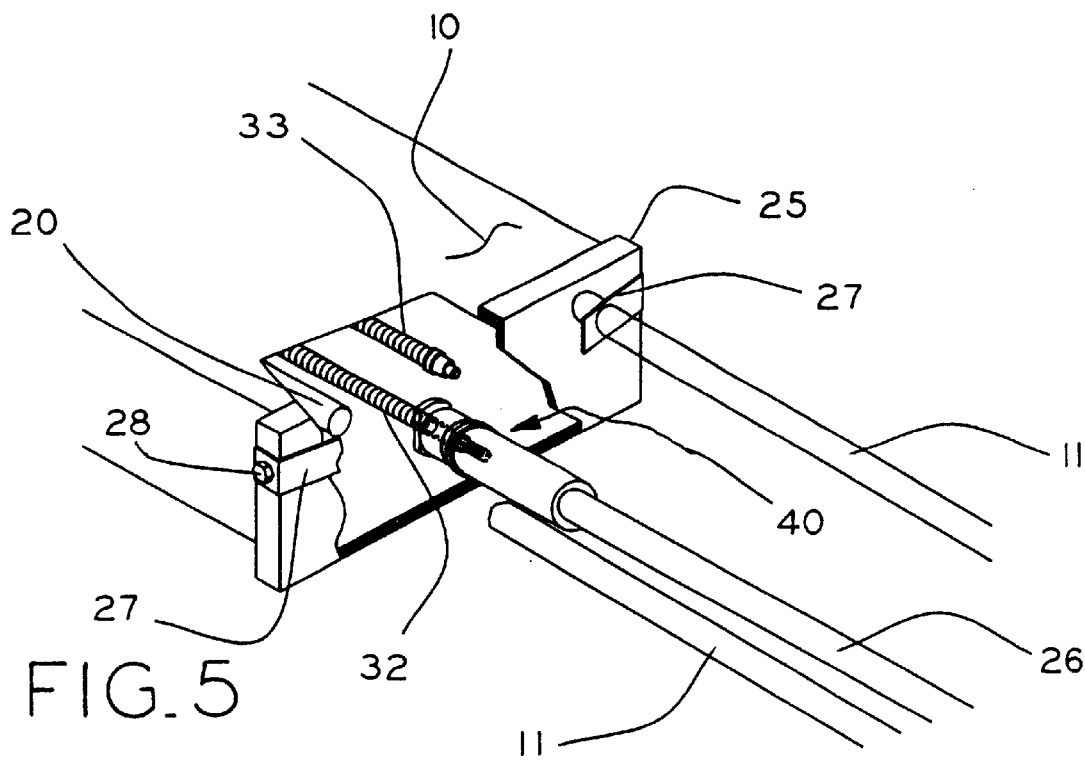
FIG. 5 is a perspective rear end view of a main lift tube assembly of FIG. 4.

FIG. 5 is a perspective rear end view of the main lift tube assembly. The main lift tube assembly 10 includes a drive screw 32 and a driven screw 33. The drive screw 32 is coupled to the crank tube 26 by a brake assembly 40 which is coupled in rear end cap 25.

Figure 6:
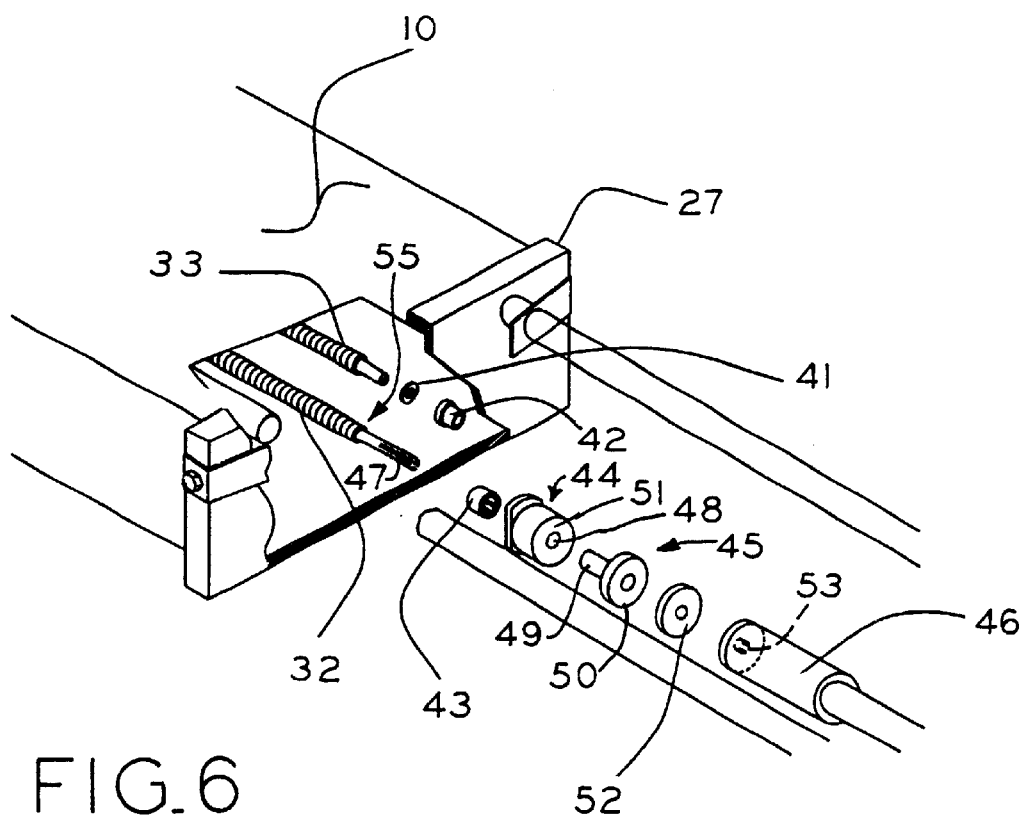
FIG. 6 is an exploded perspective rear end view of the main lift tube assembly of FIG. 4.

FIG. 6 is an exploded perspective rear end view of the main lift tube assembly. FIG. 6 depicts a washer 41 which is used in conjunction with bearing 42 to rotatably couple driven screw 33 to rear end cap 25. The brake assembly 40 which couples the drive screw 32 to the crank tube 26 includes a roller clutch 43 which is received in a roller clutch housing 44, a brake collar 45, a washer and a brake engagement coupler 46. The roller clutch housing 44 is coupled in rear end cap 27 in a fixed manner so that it does not rotate. The roller clutch 43 is received on a threaded, stepped end 47 of drive screw 32. Roller clutch housing 44 includes a central opening 48 which receives alignment guide 49 of brake collar 45. In addition to the alignment guide 49, brake collar 45 also includes an annular brake element 50 which is positioned between the face 51 of roller clutch housing 44 and washer 52. The roller clutch 43 and roller clutch housing 44 allow brake collar 45 to rotate freely in only one direction. The end of brake engagement coupler 46 includes an internal threaded bore 53 which is threadedly coupled to the threaded, stepped end 47 of drive screw 32.

In operation, the brake assembly allows the drive screw 32 to rotate in a direction which causes push blocks 30, 31 to push spring elements 20 outward from main lift tube assembly 10, while preventing drive screw 32 from freely rotating in an opposite direction. Thus, the brake assembly 40 prevents top 3 from lowering unintentionally. Specifically, when drive screw 32 rotates in a direction that would cause top 3 to be lowered, the cooperation between roller clutch 43, roller clutch housing 44 and brake collar 45 which causes the end of alignment guide 49 to be pressed against the stepped end 55 of drive screw 32, while annular brake element 50 is pressed against washer 52, thus preventing free rotation of drive screw 32. Accordingly, as can be understood, the top 3 can only be lowered by turning manual crank handle 5.

Figure 7:
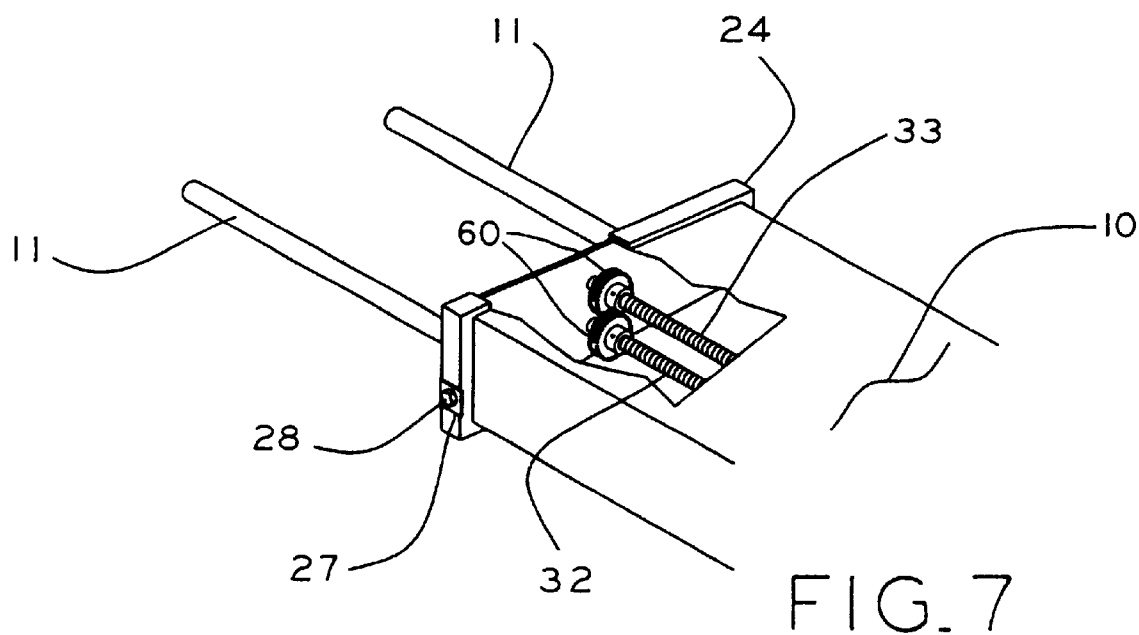
FIG. 7 is a perspective front end view of the main lift tube assembly of FIG. 4.

FIG. 7 is a perspective front end view of the main lift tube assembly. FIG. 7 depicts how the ends of drive screw 32 and driven screw 33 are received in spur gears 60 that are coupled to front end cap 24. The cooperation of spur gears 60 transfers rotational motion applied to drive screw 32 to driven screw 33 so that drive screw 32 and driven 33 screw rotate in opposite directions.

Figure 8:
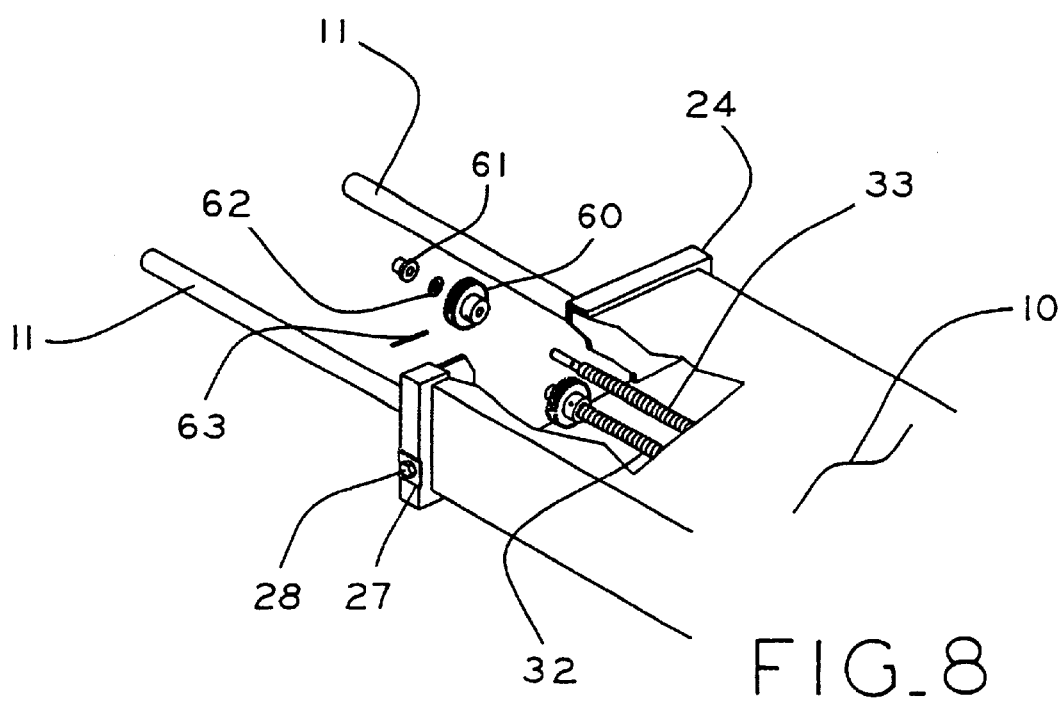
FIG. 8 is an exploded perspective rear end view of the main lift tube assembly.

FIG. 8 is an exploded perspective front end view of the main lift tube assembly. FIG. 8 depicts how spur gears 60 are coupled to bearings 61 with washers 62 interspersed. FIG. 8 also depicts pins 63 which can be used to couple spur gears 60 to the ends of drive screw 32 and driven screw 33.

Figure 9:
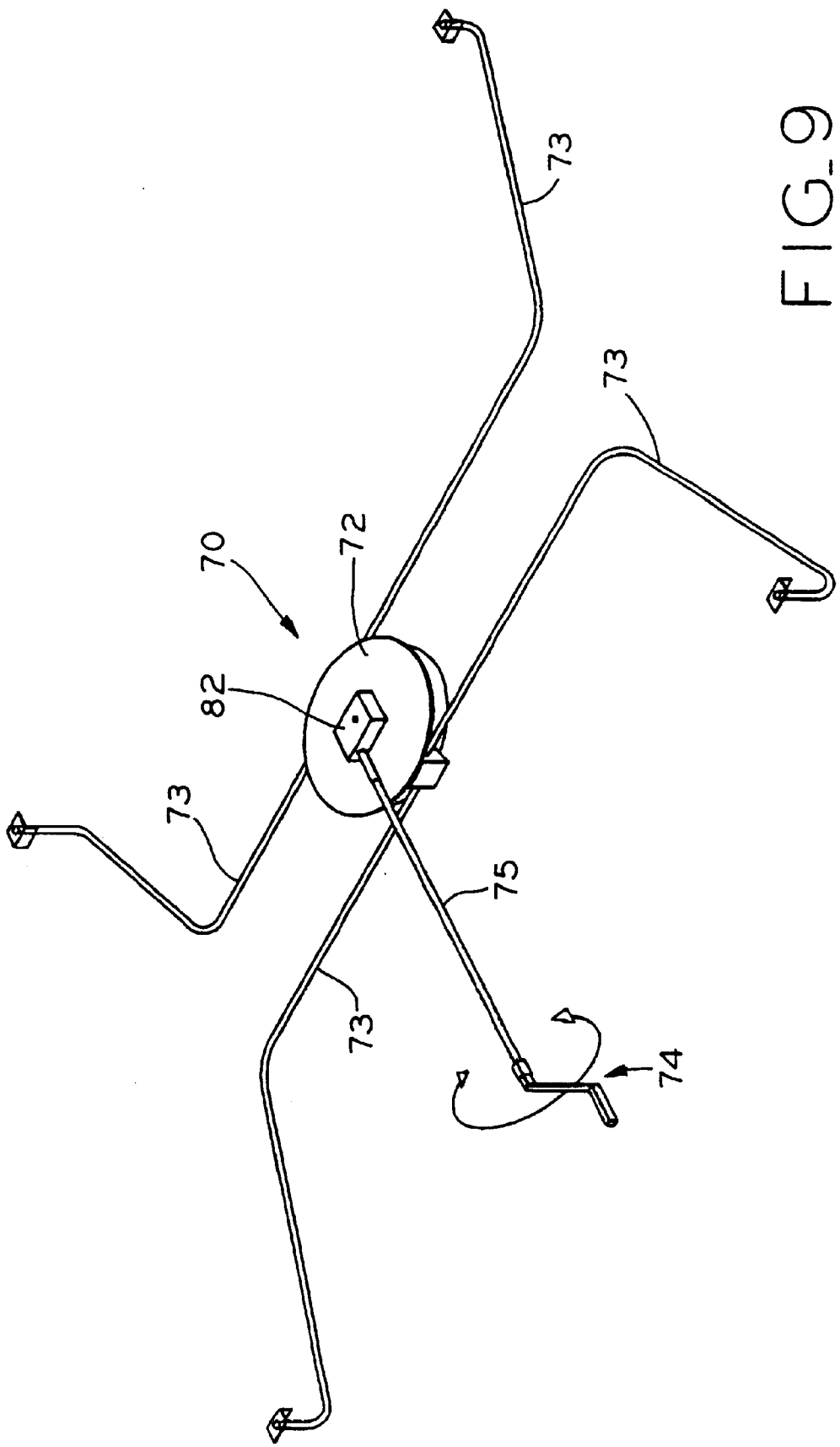
FIG. 9 is a perspective view of an alternative main lift tube assembly according to the present invention.

FIG. 9 is a perspective view of an alternative main lift tube assembly. The main lift tube assembly 70 in FIG. 9 includes a rotating drum assembly 72 from which spring elements (FIG. 11) can be pushed into and pulled from spring tubes 73 as discussed below. The rotating drum assembly includes a manual crank handle 74 which is coupled thereto by a crank tube 75. In further embodiments, an electrical actuator can be used in place of manual crank handle 75.

Figure 10:
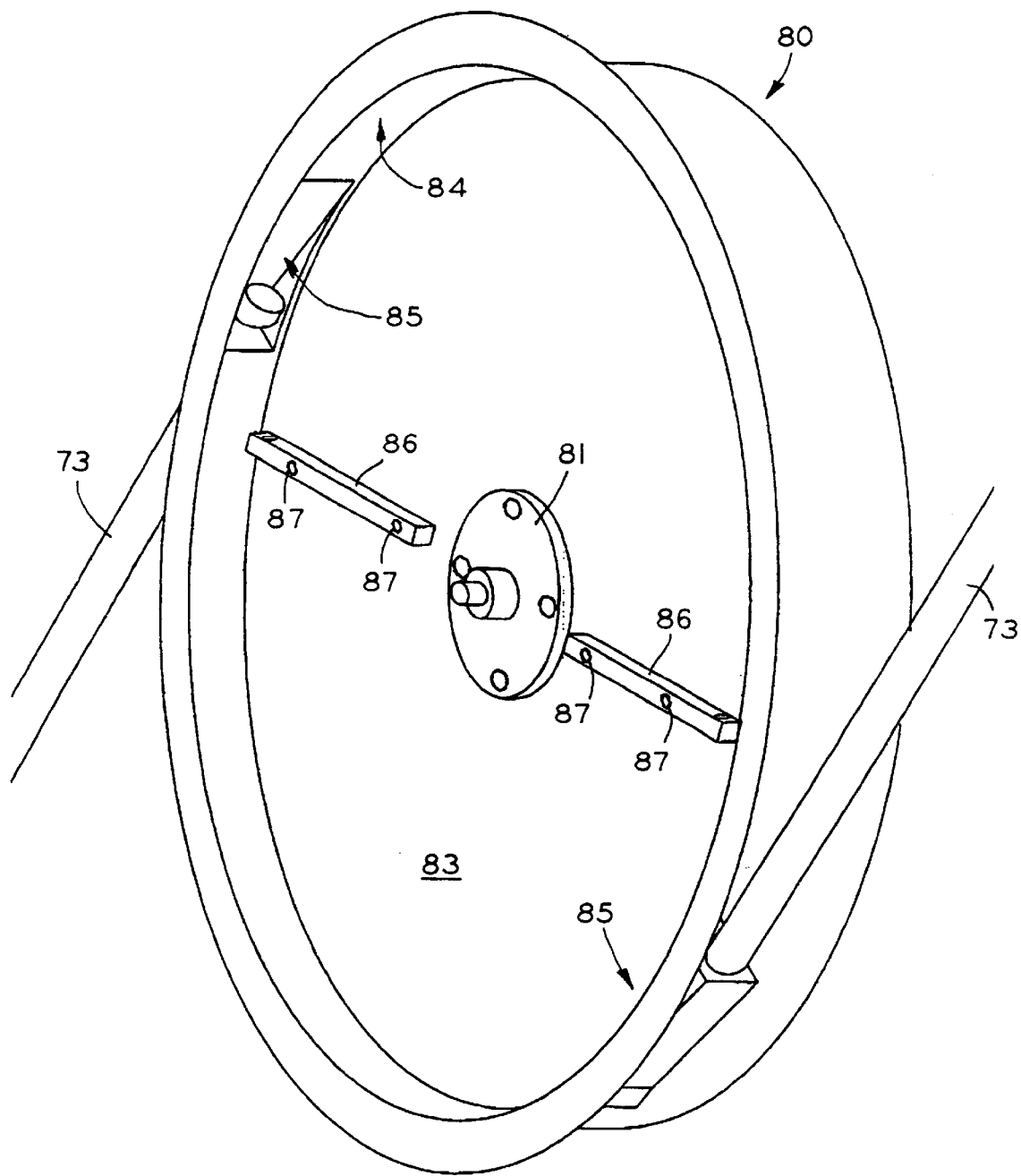
FIG. 10 is a perspective view of a portion of the rotating drum assembly of FIG. 9.

FIG. 10 is a perspective view of a portion of the rotating drum assembly of FIG. 9. The rotating drum assembly 70 of the embodiment of FIG. 9 includes two drum elements which can rotate in opposite directions or in the same direction. FIG. 10 depicts one of the drum elements 80. Drum element 80 includes a central hub 81 which is coupled to a drive mechanism 82 (FIG. 9) which can rotate drum element 80 when manual crank handle 74 is rotated. The drum element 80 includes a face 83 which is recessed by peripheral wall 84. The peripheral wall 84 includes two opposed openings 85 at which spring tubes 73 are tangentially coupled as depicted. Two radially aligned arms 86 are provided on the face 83 of drum element 80. The arms 86 can be fastened to the face 83 of drum element 80 by mechanical fasteners 87 such as bolts, or otherwise can be integrally formed thereon.

Figure 11:
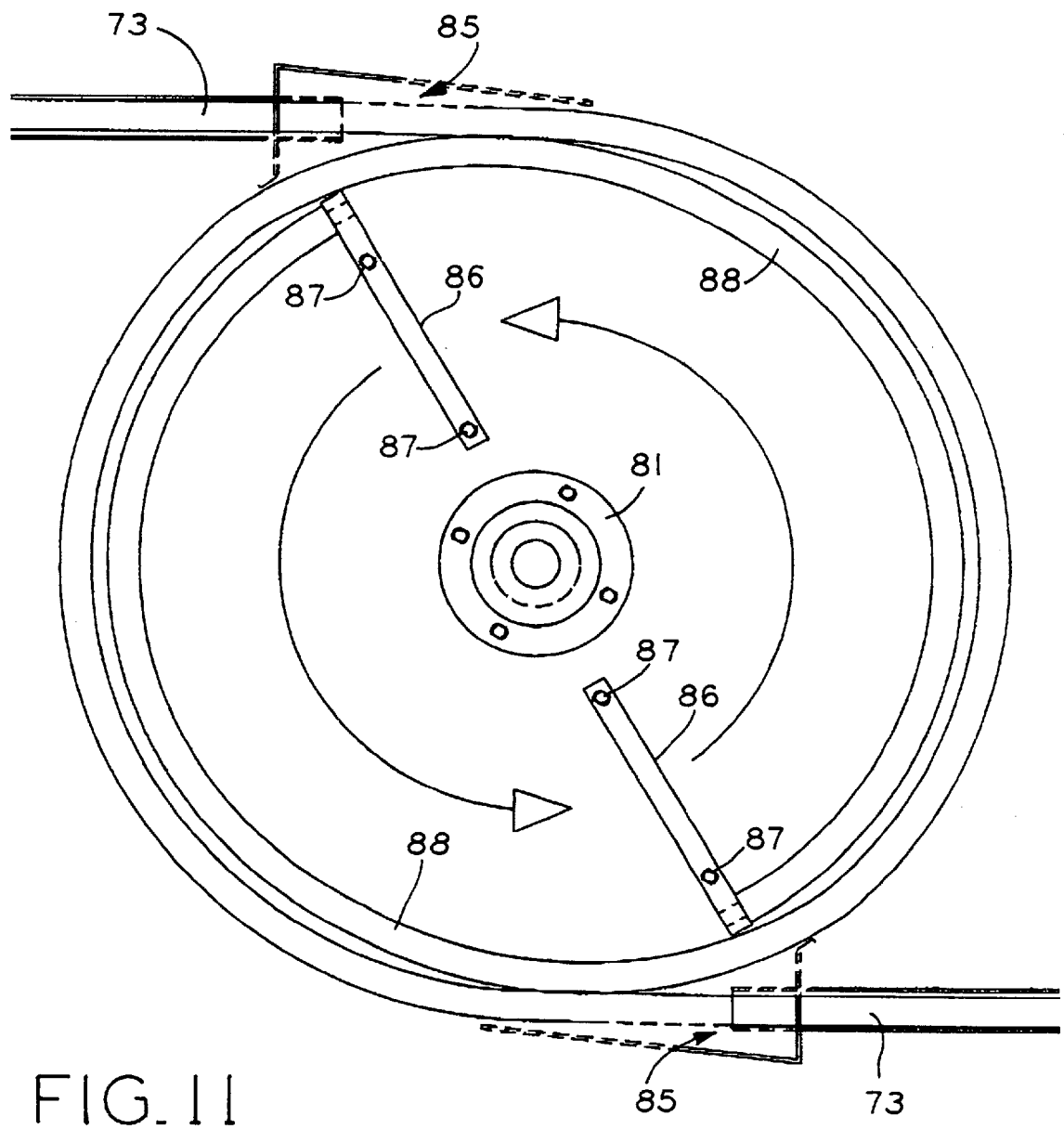
FIG. 11 is a planar view which depicts how spring elements are wound in the drum elements.

FIG. 11 is a planar view which depicts how spring elements are wound in the drum elements. The ends of two spring elements 88 such as extension springs are secured to outer portions of arms 86 so that they extend in the same angular direction as depicted. The spring elements 88 are wound within the wall 84 of drum element 80 as shown. In this regard, it is noted that a gap is provided between the outer ends of arms 86 and inner surface of wall 84 which is wide enough to allow the spring elements 88 to pass therethrough when wound as shown in FIG. 11. As also shown in FIG. 11, the spring elements 88 extend outward from drum element 80 into and through spring tubes 73.

Figure 12:
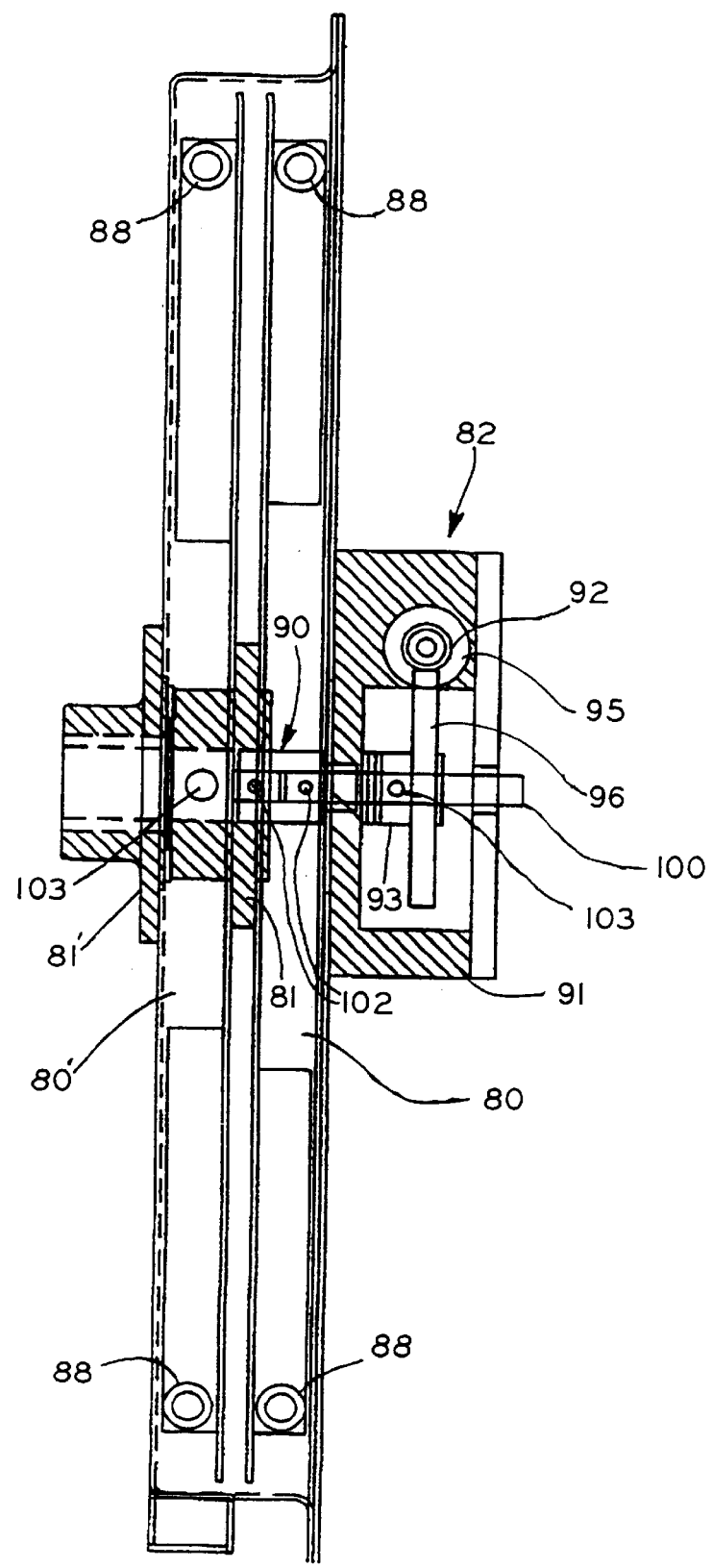
FIG. 12 is a side cross sectional view of a rotating drum assembly according to one embodiment of the present invention.

FIG. 12 is a side cross sectional view of a rotating drum assembly according to one embodiment of the present invention. As can be seen, the rotating drum assembly 70 includes two drum elements 80 and 80' each of which includes two spring elements 88. In the embodiment of the invention depicted in FIG. 12, the two drum elements 80 and 80' are rotated in the same direction by shaft 101. Shaft 101 and shaft 100 are coupled together by collar 90 and pins 102. The two drum elements 80 and 80' are mounted to hub 81 with machine screws and hub 81 is pinned to shaft 101 by pins 103. Hub 81' is mounted to the bottom of rotating drum assembly 70 with bolts (not shown) which extend from the inside out (hub 81' is threaded to receive such bolts). Gear 96 is coupled to shaft 100 by pin 103.

Figure 13:
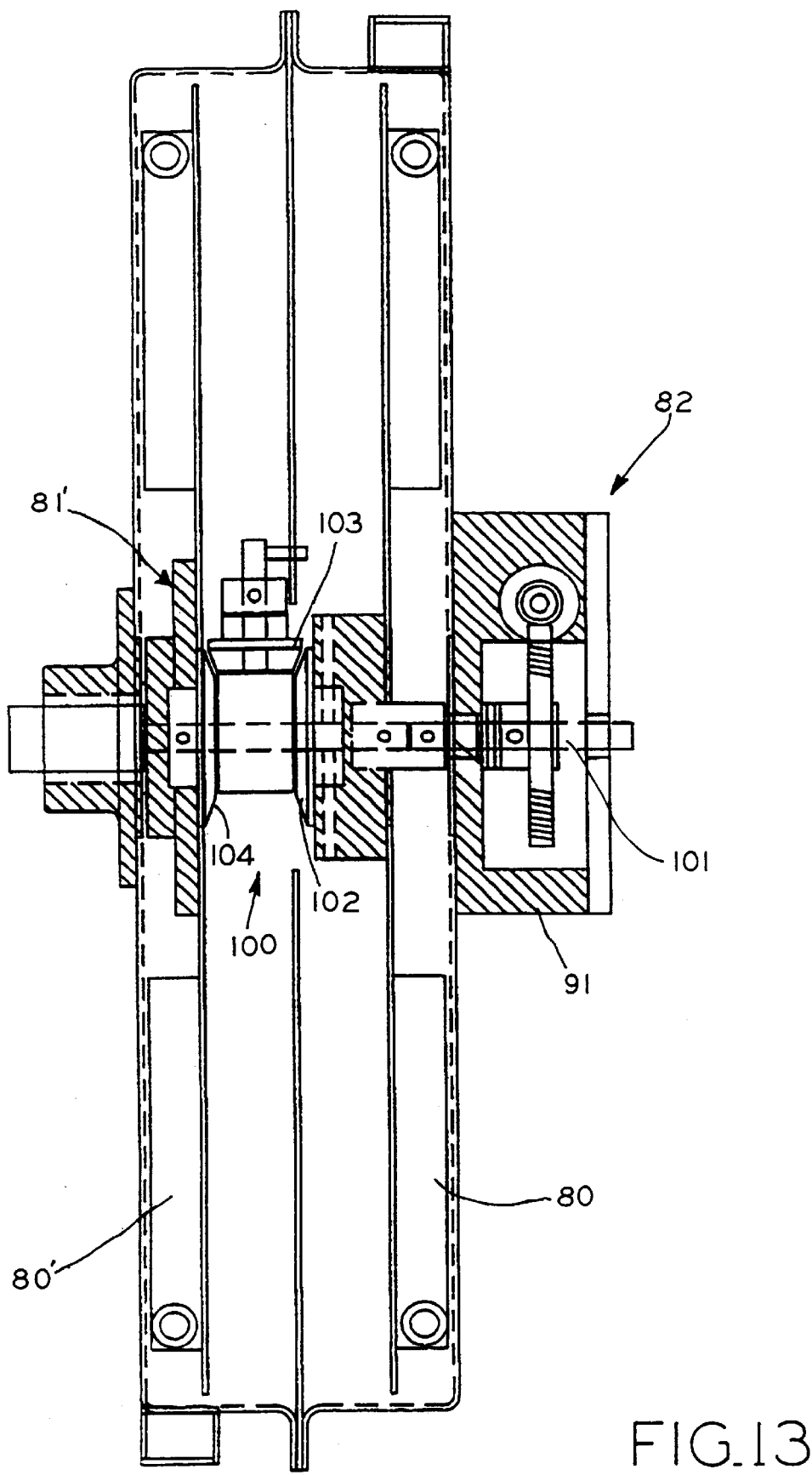
FIG. 13 is a side cross sectional view of a rotating drum assembly according to another embodiment of the present invention.

FIG. 13 is a side cross sectional view of a rotating drum assembly according to another embodiment of the present invention. In the embodiment of the invention depicted in FIG. 13, drum elements 80 and 80' rotate in opposite directions by means of a gear assembly 100 which is provided therebetween. In this embodiment of the invention, shaft 101 is rotated by drive mechanism 82 and rotates drum element 80 and gear 102. Gear 102 rotates intermediate gear 103 which rotates gear 104 that is coupled to hub 81' of drum element 80'

In each embodiment, the rotating drum assembly operates as follows. When the top 3 is in its lowered position, two pairs of spring elements 88 are wound within each drum element 80, 80' as depicted in FIG. 11. When drive mechanism 82 is actuated, for example by turning manual crank handle 74, the drum elements 80, 80' rotate and arms 86 push spring elements 88 outward through spring tubes 73. As in the embodiment of the invention depicted in FIGS. 1–8, spring elements 88 are guided by spring tubes 73 so that the ends thereof push telescopic tube assemblies 4 upward to lift top 3. The top 3 is lowered by rotating manual crank handle 74 in an opposite direction. As manual crank handle 74 is rotated in an opposite direction, arms 86 cause spring elements 88 to be wound along walls 84 of drum elements 80, 80'. As spring elements 88 are wound in drum elements 80, 80' they are pulled or retracted from spring tubes 73 and cause telescopic tube assemblies 4 to be lowered. It is noted that a brake assembly similar to that depicted in FIG. 6 could be incorporated into the gear box 91 of FIGS. 12 and 13.

FIG. 14 is a cross sectional view of a guide assembly for the push blocks according to one embodiment of the present invention. The guide assembly in FIG. 14 utilizes push blocks 15 which have central through-holes 16 for receiving either the drive screw 32 or driven screw 33, and a pair of outer through-holes 17 to which spring elements 20 are attached as discussed above. The central through-holes 16 are configured, i.e. provided with internally threaded bearings, to effect movement of the push blocks 15 when the drive screw 32 and driven screw 33 are rotated as discussed above. In the embodiment depicted in FIG. 14, guide elements 18 are used to maintain alignment of the spring elements 20 and push blocks 15 as they move linearly within the main tube assembly 10. The guide elements 18 have slots 19 into which the end portions of the push blocks 15 are received, and tabs or projections 21 that are configured to interlock with projections 29 and/or grooves 34 formed on the inner surface of the main tube assembly 10. It is to be understood that the guide elements 18 could have engaging structures different from the tabs or projections 21 depicted so long as compatible interlocking structures are provided on the inner surface of the main tube assembly 10. Moreover, the ends of the push blocks 15 can have other shapes than the shape depicted as long as the guide elements 18 are configured to receive and guide movement of the push blocks 15 within main tube assembly 10. The guide elements 18 can be are preferably made of a suitable guide or bearing material such as a soft metal, e.g., brass or aluminum, or a plastic such as tetrafluoroethylene.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as herein described.

What is claimed is:

1. A cableless extendable and retractable support system for raising and lowering a structure which comprises:
   a base;
   a structure to be raised and lowered relative to the base;
   a plurality of telescopic assemblies coupled between the base and structure to be raised and lowered;
   a plurality of spring elements having first and second ends with second ends thereof coupled to the plurality of telescopic assemblies; and
   a lift tube assembly coupled to first ends of each of the plurality of spring elements, the lift tube assembly including a mechanism which, when activated, selectively extends or retracts each of the plurality of spring elements therefrom, said mechanism including a gear mechanism which allows the plurality of spring elements to be selectively extended or retracted without the use of a cable system, and a housing which encloses the entire mechanism that extends and retracts the plurality of spring elements.

2. A cableless extendable and retractable support system for raising and lowering a structure which comprises:
   a base;
   a structure to be raised and lowered relative to the base;
   a plurality of telescopic assemblies coupled between the base and structure to be raised and lowered;
   a plurality of spring elements having first and second ends with second ends thereof coupled to the plurality of telescopic assemblies; and
   a lift tube assembly coupled to first ends of each of the plurality of spring elements, the lift tube assembly including a mechanism which, when activated, selectively extends or retracts each of the plurality of spring elements therefrom and a housing which encloses the entire mechanism that extends and retracts the plurality of spring elements,
   the mechanism that extends and retracts the plurality of spring elements includes a drive screw and a driven screw, a gear mechanism which causes the drive screw and driven screw to rotate in opposite directions, and a pair of opposed push blocks which are mounted on the drive and driven screws, the first ends of each of the plurality of spring elements being coupled to the pair of push blocks, whereby the plurality of spring elements are selectively extended or retracted without the use of a cable system.

3. A cableless extendable and retractable support system for raising and lowering a structure according to claim 2, wherein the drive screw and driven screw simultaneously rotate in opposite directions with respect to one another.

4. A cableless extendable and retractable support system for raising and lowering a structure according to claim 2, wherein the drive screw and driven screw are coupled together gears which transfers rotational motion applied to drive screw to driven screw so that drive screw and driven screw rotate in opposite directions.

5. A cableless extendable and retractable support system for raising and lowering a structure according to claim 2, wherein a manual crank is coupled to the drive screw, the manual crank extending to a peripheral edge of the base.

6. A cableless extendable and retractable support system for raising and lowering a structure according to claim 5, wherein the manual crank is coupled to the drive screw via a brake assembly.

7. A cableless extendable and retractable support system for raising and lowering a structure according to claim 6, wherein the brake assembly comprises a roller clutch.

8. A cableless extendable and retractable support system for raising and lowering a structure according to claim 2, wherein the base comprises a base of a camper and the structure to be raised and lowered comprises a top of the camper.

9. A cableless extendable and retractable support system for raising and lowering a structure according to 2, further comprising a plurality of guide tubes which are coupled between the plurality of telescopic assemblies and the mechanism that extends and retracts the plurality of spring elements, the plurality of spring elements being located in the plurality of guide tubes.

10. A cableless extendable and retractable support system for raising and lowering a structure according to 9, wherein the housing includes opposite end caps to which the plurality of guide tubes are coupled.

11. A cableless extendable and retractable support system for raising and lowering a structure according to 2, further comprising a guide elements receiving said opposed push blocks.

12. A cableless extendable and retractable support system for raising and lowering a structure according to claim 1, wherein the base comprises a base of a camper and the structure to be raised and lowered comprises a top of the camper.

13. A cableless extendable and retractable support system for raising and lowering a structure according to 1, further comprising a plurality of guide tubes which are coupled between the plurality of telescopic assemblies and the mechanism that extends and retracts the plurality of spring elements, the plurality of spring elements being located in the plurality of guide tubes.

14. A cableless extendable and retractable support system for raising and lowering a structure according to 13, wherein the housing includes opposite end caps to which the plurality of guide tubes are coupled.

* * * * *